United States Patent Office 3,352,219
Patented Nov. 14, 1967

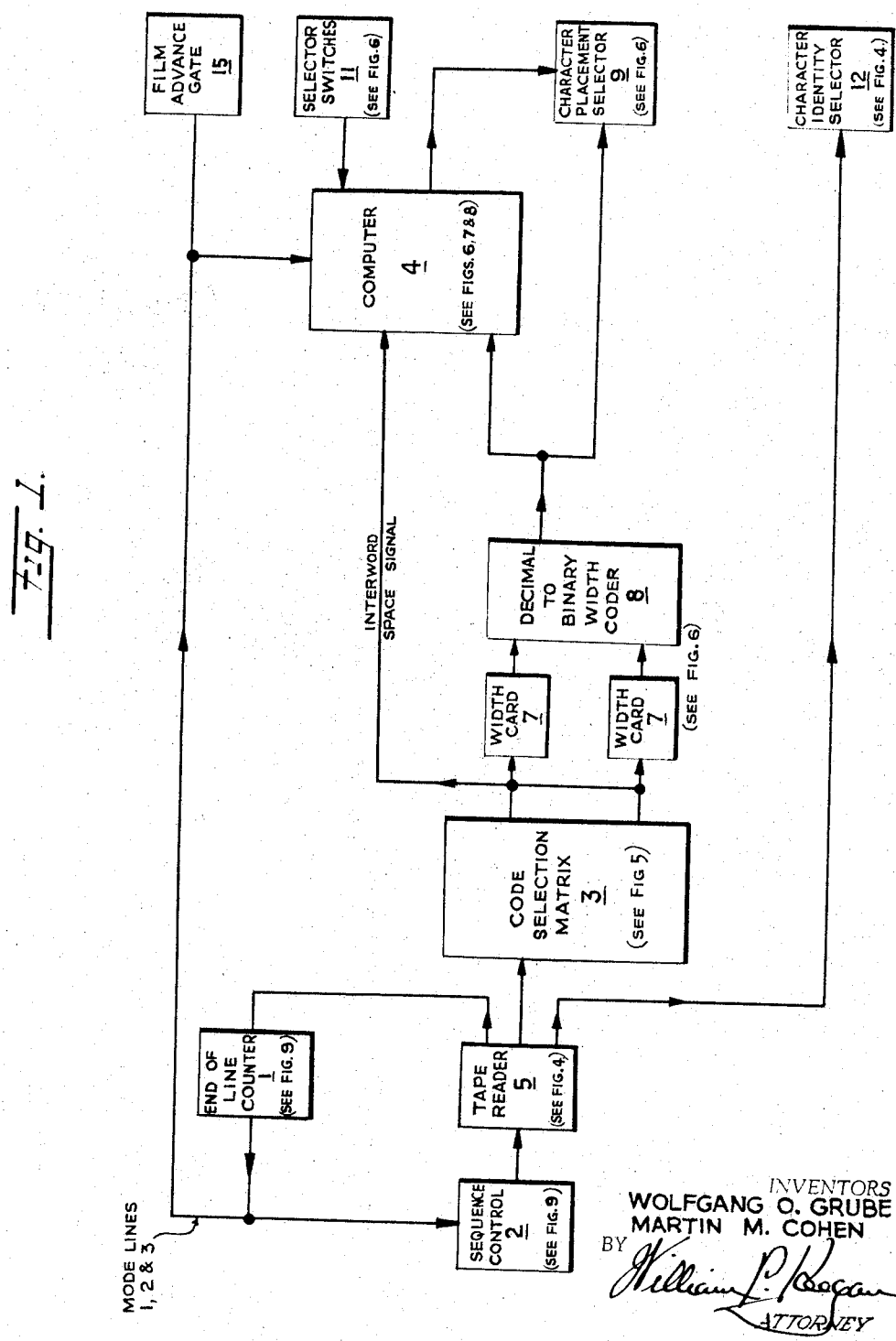

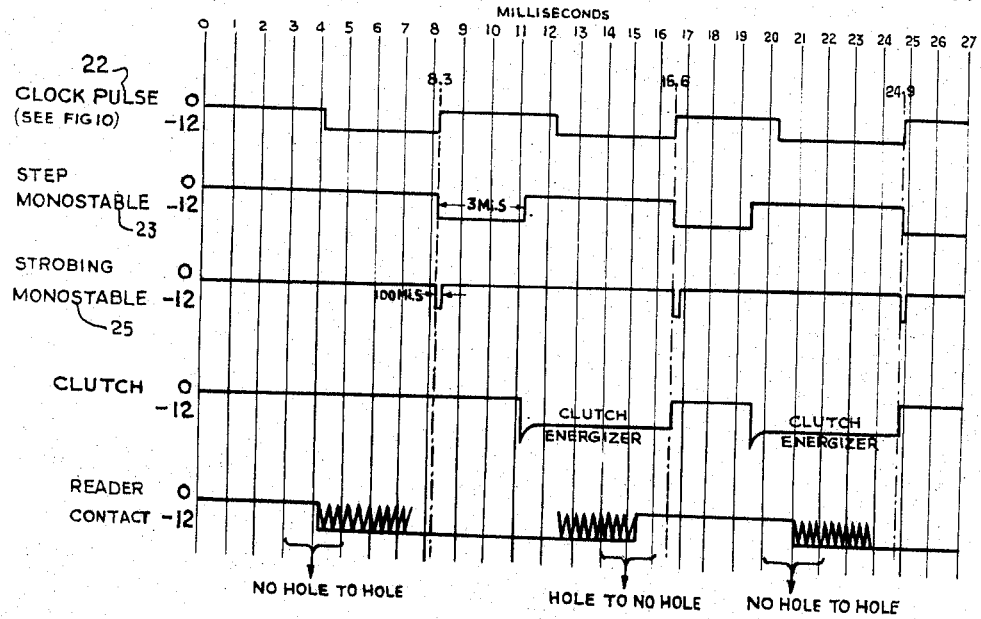
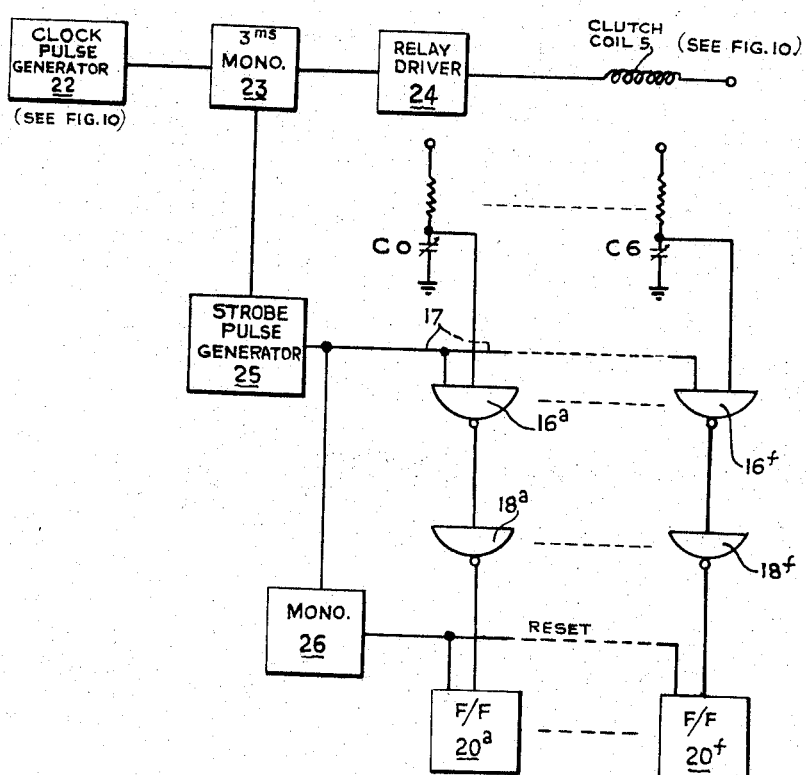

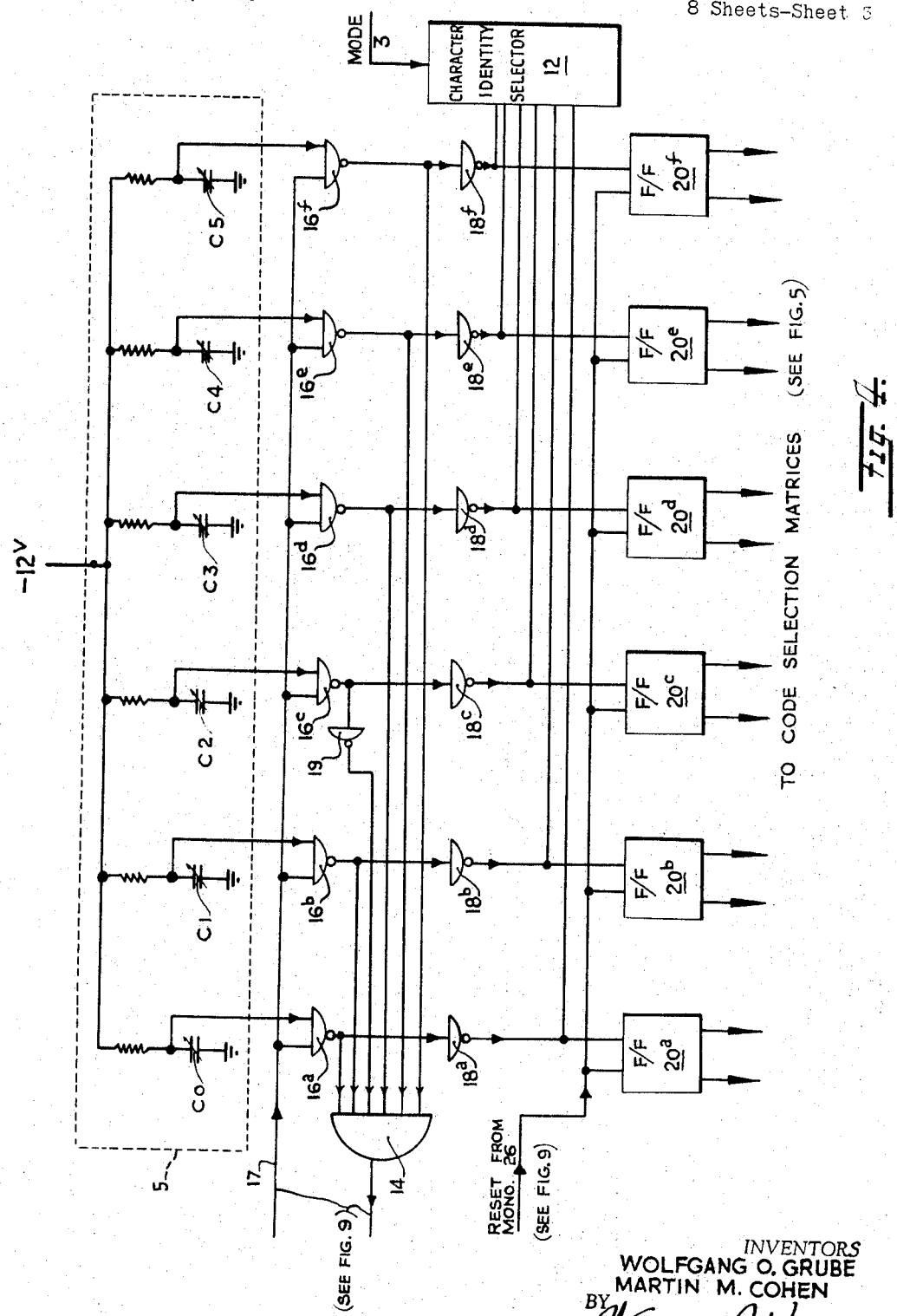

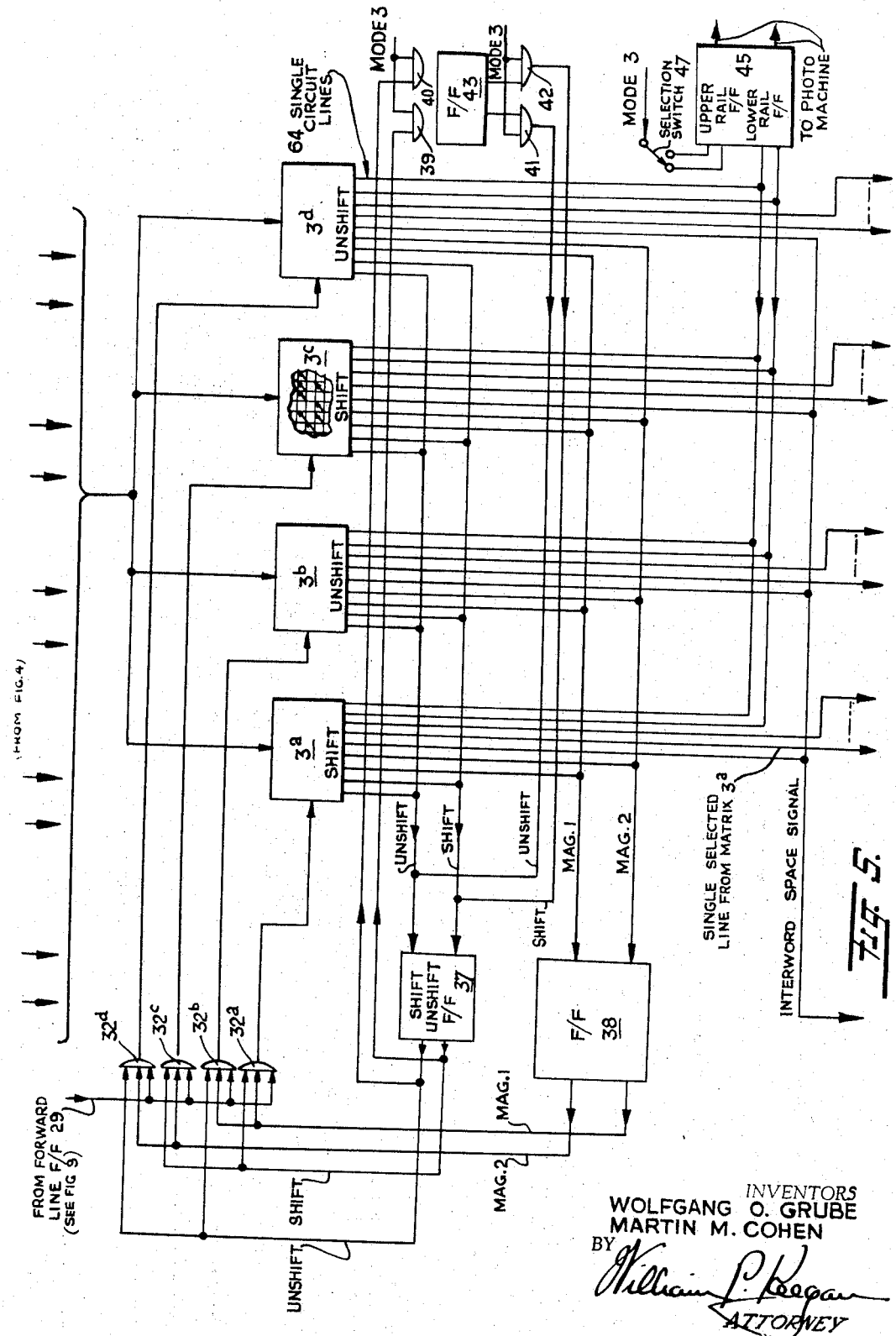

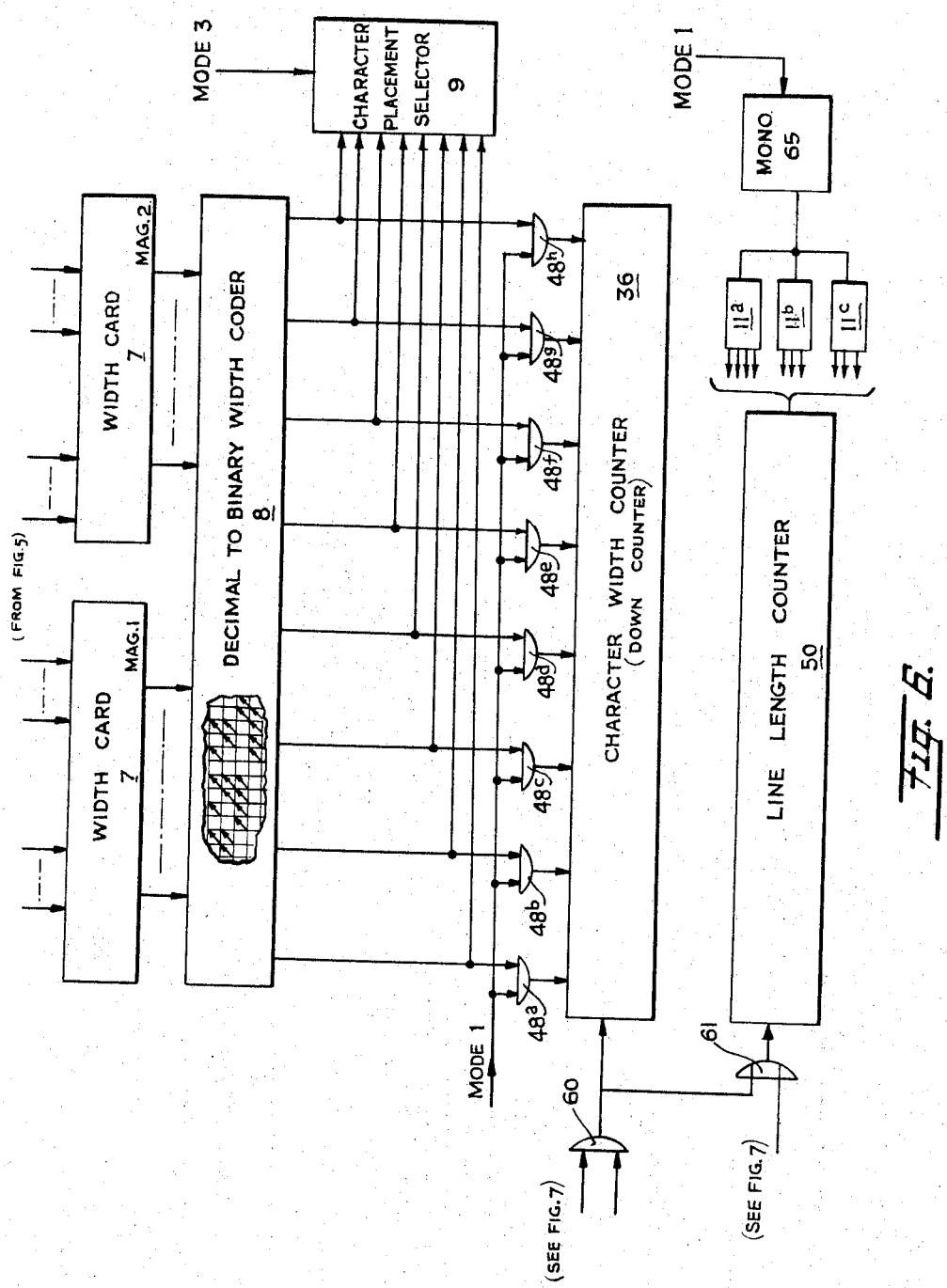

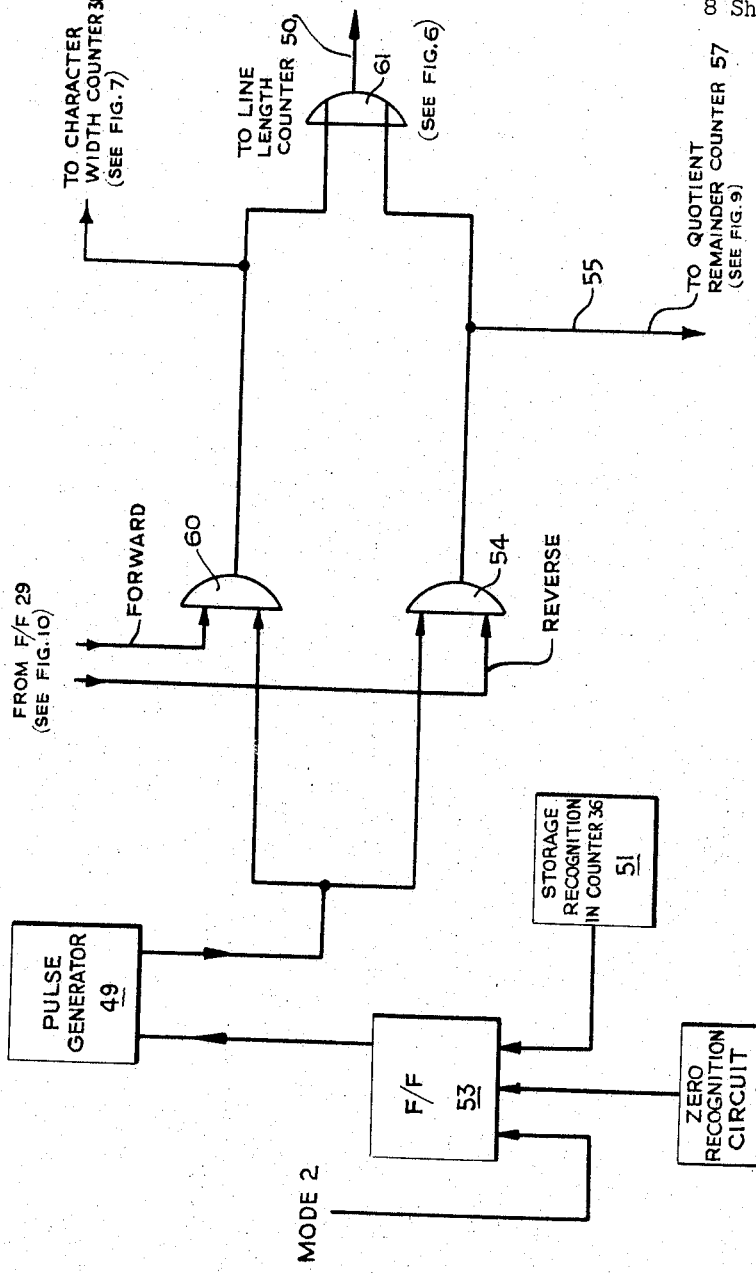

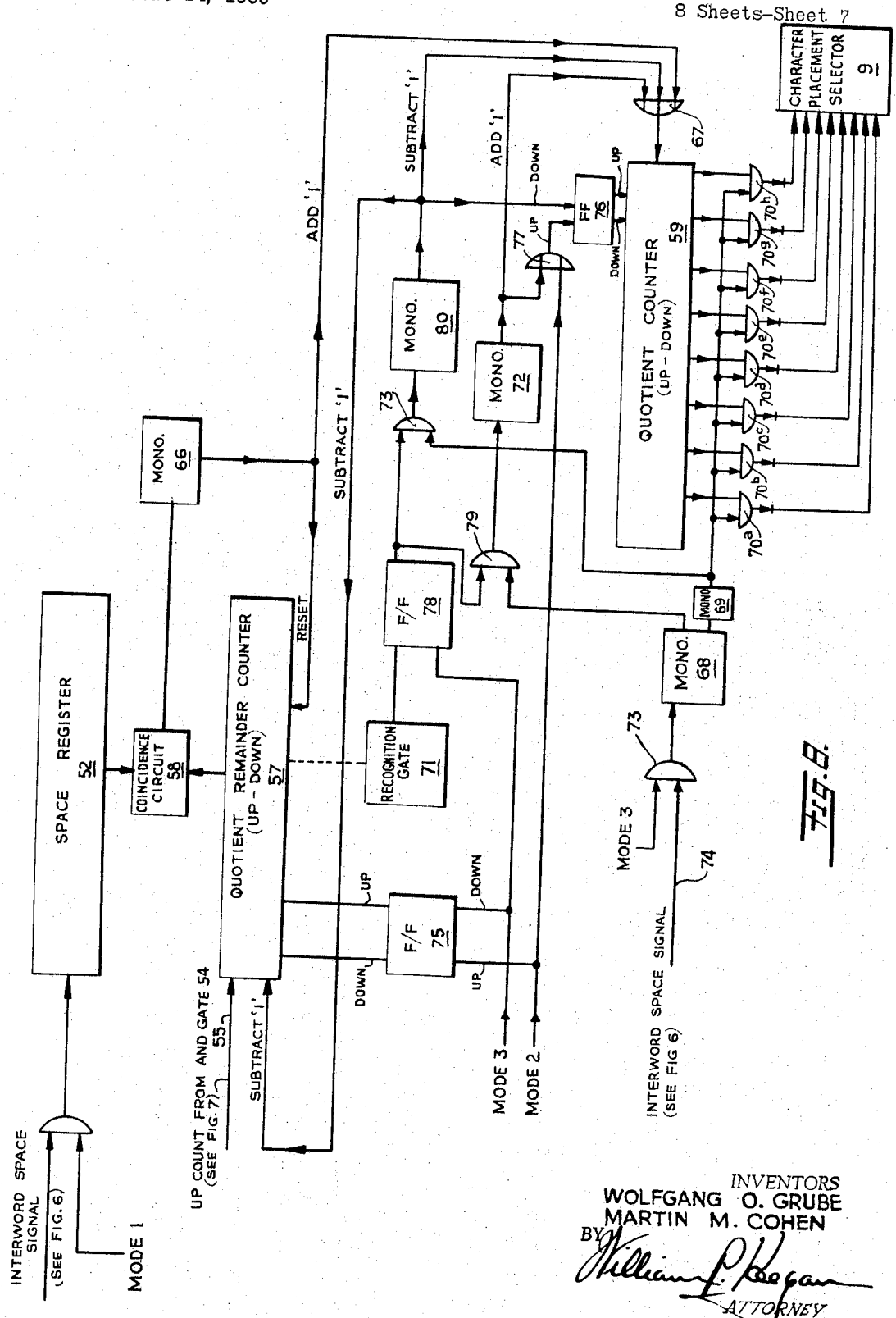

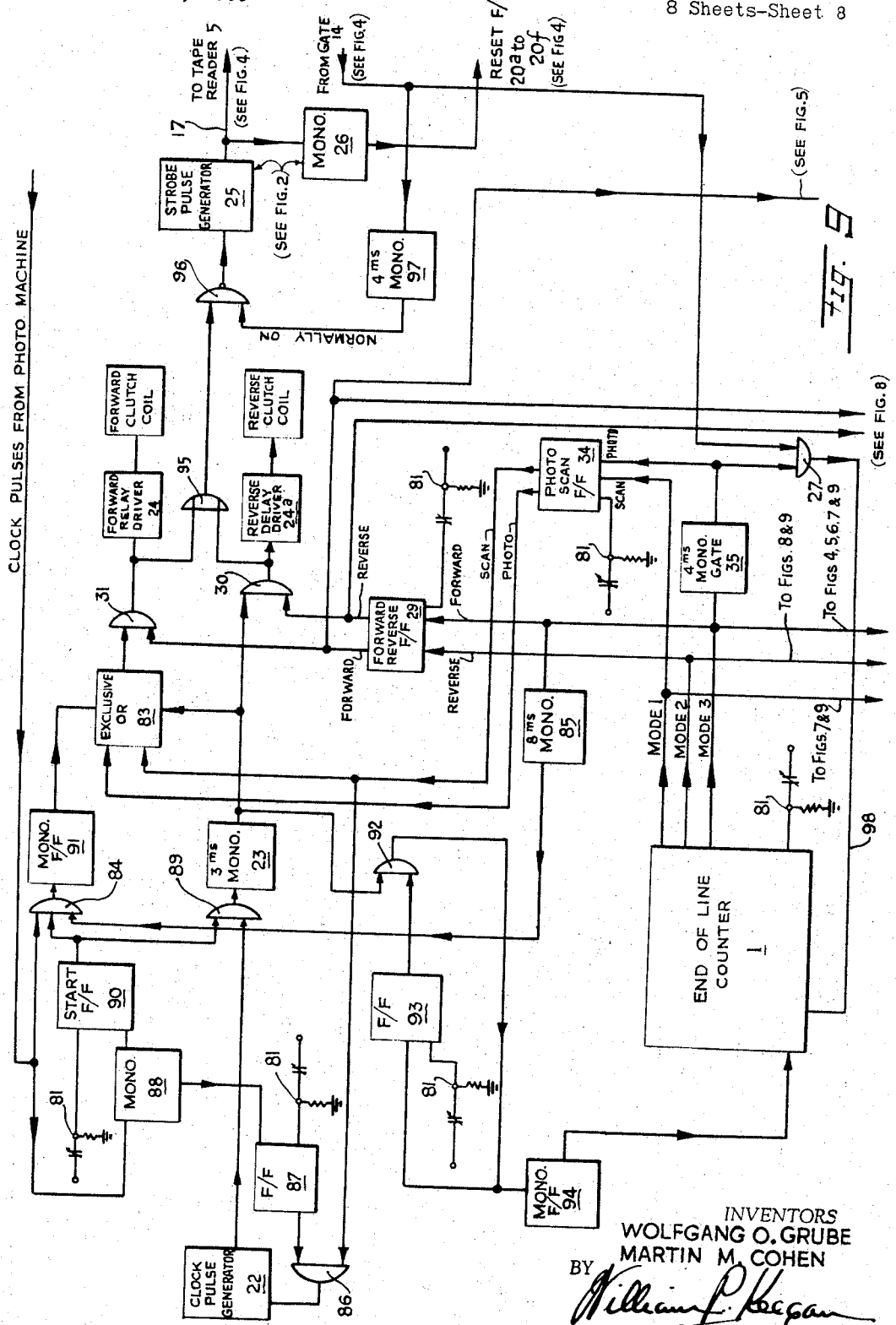

3,352,219
PHOTOCOMPOSING MACHINES
Wolfgang O. Grube, Leonia, N.J., and Martin M. Cohen, Bronx, N.Y., assignors to Eltra Corporation, a corporation of New York
Filed June 14, 1965, Ser. No. 463,637
19 Claims. (Cl. 95—4.5)

ABSTRACT OF THE DISCLOSURE

The invention relates principally to a photocomposing machine that is controlled by a code tape that contains character identity signals only, the signals for each line being separated by an end of line signal. The signals for each line are decoded twice, once to compute the justification or quadding answer required for composition of the line, and secondly for the photocomposition of the line in the desired format.

---

The present invention relates to tape operated photocomposing machines.

Generally speaking, the method of justifying lines of composition in photocomposing machines is based on the principle of assigning a unit width to each character of the typographical font and to the desired justified line length. Thus, the various characters of the font will have variable widths, but each such width will be some multiple of the basic unit, and a line length will be a much larger multiple of the same basic unit. To justify a line of characters, the cumulative width in units of all of the characters in a line will be subtracted from the number of units in the desired line length and the remainder will be divided among the interword spaces. This method of justification is well known and apparatus for preparing a coded tape with justification information coded thereon has been disclosed in the past. See, for example, U.S. Patents Nos. 2,848,049 and 3,056,545. Also, photocomposing machines which are controlled by coded tapes so prepared have been disclosed, as in U.S. Patents Nos. 2,923,215 and 3,106,880.

The present invention, more specifically, relates to photocomposing apparatus which employs the unit system of character width for line composition and for computing justification, but which is controlled by a coded tape that does not include the justification information heretofore necessary on such tapes. Such a tape would, for example, be the standard TTS tape presently used for controlling linecasting machines.

Linecasting machines employ circulating matrices which are assembled in line and justified by means of expansible spacebands. Therefore, the standard TTS tape only includes character selection signals, machine function signals, and return and elevate signals. These latter signals are termed end of line signals and divide the character signals into blocks representing lines of composition.

In carrying out the present invention there is provided a bi-directional tape reader that can step and read the coded tape in both directions. Thus the tape can be stepped through the reader a first time during which the justification information is computed. Then the direction of tape feed is reversed and the tape restored to its initial start of line position. The direction of tape feed is again reversed, and the tape stepped through the reader, during which time the character signals are decoded and photographic composition of the line effected, the information necessary for justification of the line coming from an apparatus which computed and stored the information during the first scanning of the tape. Control circuitry is also provided for controlling movement of the tape through the reader in response to the decoding of an end of line signal on the tape.

A feature of the invention is that a TTS tape prepared for the control of a linecasting machine can be used to control a photocomposing machine.

Another feature of the invention is that the coded tape is decoded twice, once for computing justification and once for controlling composition of the line, thereby obviating the need for apparatus to store the character identification information.

Other features and advantages may be gained from the foregoing and from the description of a preferred embodiment of the invention which follows.

In the drawings:

FIG. 1 is a block diagram of the data processing apparatus embodying the present invention;

FIG. 2 is a timing diagram of the tape movement control circuitry;

FIG. 3 is a fragmentary block diagram of the basic operating circuits which control the operation of the tape reader;

FIGS. 4 and 5 are respectively details of the tape reader and the code selection matrices of FIG. 1;

FIGS. 6, 7 and 8 are details of the width cards, and the binary coder matrix blocks of FIG. 1, and of the justification computer; and FIG. 9 is a detail of the sequence control block of FIG. 1.

Referring now to the system block diagram of FIG. 1, the general arrangement and basic logic of the present invention is set forth. The tape reader 5 can be a commercially available type which is capable of operating in bi-directional modes. As will be seen, it is advantageous if the reader is able to operate rapidly in either a forward or reverse direction; for example, a decoding of 120 code rows or characters per second is satisfactory. The end of line counter 1 is adapted to set the tape reader and the rest of the system in a selected one of three modes of operation. This selection of operating mode is accomplished by the sequence control circuitry 2. In "mode one" the tape is rapidly moved in a forward direction and read or scanned so that the width information of the characters making up the line is fed through code selection matrices 3 and the width cards 7 to the justification computer 4. At the end of the group of character signals, the reader senses an end of line signal and counter 1 is actuated to initiate "mode two." In "mode two" the feed of the tape is reversed and it is stepped backwardly in rapid fashion until the prior end of line signal is reached and decoded. During backward movement of the tape all justification computations will be completed in computer 4; the tape itself is not read except to determine when the end of line signal is reached. The recognition of the end of this line signal which precedes the line to be composed and for which justification was computed, causes the tape to stop and reverse again. During this third passage of the tape past the read head, hereafter referred to as "mode three," the character signals are decoded and photographic composition of the line is effected as described, for example, in the aforementioned patents. During "mode three," the tape is advanced at a much slower speed than during modes one and two, so that the characters are photographed at the operating speed of existing type machines which can be controlled by the present apparatus. This is in the neighborhood of 10 to 20 characters or code signals per second, as compared to an operating speed of about 120 code signals per second during operation of modes one and two. When an end of line signal is again reached a perfectly justified line will have been composed and the next line will be ready to be processed.

Since during mode two the tape is merely returned to its start of line position preparatory to the photographing of a line of selected characters, and no reading of the tape occurs except to decode the end of line signal and thereby arrest backward stepping of the tape, the circuitry that is operative during modes one and three will be generally described with reference to FIGS. 4, 5 and 6. Thereafter, a more detailed description of the same circuitry will be given.

The coded tape is a TTS tape having a six level binary code. The codes are perforated in a paper tape and hence the tape reader will preferably have feeler fingers to detect the presence of a code perforation. The character signals that go to make up a line will be grouped and each line of signals will be separated from other lines by an end of line signal. Thus, an end of line signal will be located at each of a group of character signals.

The bi-directional tape reader 5 is provided with read fingers which are under the control of a cam member so that they rise to sense the tape and determine if either a hole or no hole condition is present in each separate code channel. A Model 464 tape reader manufactured by Tally Register Corporation of Seattle, Wash., can be readily used in the present invention. Six separate pairs of contacts C0 to C5 monitor the movement of the read fingers and each pair of contacts will open only if its associated read finger senses a code perforation; otherwise the contacts remain closed.

For the moment only the circuits controlled by the first reader contact C5 of FIG. 4 will be explained as they can be considered representative of the circuits controlled by the remaining contact. NAND gate 16f, one of six monitoring gates, is provided with two inputs, strobing pulse line 17, which will be described hereinafter, and a lead line located directly above the C5 contact. When this contact is open, as by its associated read finger detecting a code perforation, and a strobing pulse is present on line 17 then the output of NAND gate 16f is off. The output of NAND 16f is fed into two gates, end of line recognition gate 14 of an AND variety, and NOT gate 18f. As seen there is a NOT gate associated with each of the NAND gates 16a to 16f. End of line recognition gate 14 will be seen hereinafter to pulse end of line counter 1. When all the inputs to gate 14 are on then its output is on. By operation of NOT gate 19 this condition occurs only when contact C2 is open and the remaining contacts closed. Under these conditions NAND gate 16c will be off and NOT gate 19 will provide a positive voltage to gate 14. Consider now the lead from gate 16f to NOT gate 18f. When the input to gate 18f is off, as it is when contacts C5 are open, then its output will be on to indicate a perforation in the "5" code row. In mode three this information is gated to the character identity mechanism 12 for character selection. This mechanism is not a part of the present invention and hence it is not described. However, it may be the shutter mechanism of the aforementioned photocomposing machine patents. The information is also gated in all three operating modes to a storage flip-flop 20f which has its two outputs leading to each of four separate code selection matrices 3a to 3d.

There are four matrix cores each representing the sixty-four signals that are available from a six-bit binary code. In the typographical embodiment disclosed here, the characters in four different type faces are represented. For example, these may be: (a) Upper case of a Roman font; (b) Lower case of a Roman font; (c) Upper case of a condensed Roman font; and (d) Lower case of a condensed Roman font. To analogize with a linecasting machine, this would be the equivalent of a two-magazine machine having one-letter matrices; one magazine having the upper and lower case Roman characters called out by shift and unshift signals respectively, and a second magazine having the upper and lower case condensed Roman characters, again called out by the shift and unshift signals, respectively. As will be seen hereinafter, provision is made for duplex rail equivalent operation to provide for Italic characters, for example. Thus the present apparatus becomes the equivalent of a two-magazine linecasting machine employing two letters matrices.

The information from all of the gates 18 to 18f will be transmitted to each of the matrix cores 3a to 3d, but only one of the cores will be conditioned to pass the information on to the remaining circuitry. The selected core will be determined by the selection of magazine "1" or magazine "2" and shift or unshift. If it is assumed that the unshift or lower case character is selected from magazine "1" then AND gate 32b will be operative and condition core 3b to pass the information on from the storage flip flops.

The matrix cores will convert the binary signal representing a character code to a decimal signal representing the same code, or in other words, to a single conductor representing the character rather than a combination of six conductors. Thus the character coded as a six-bit binary signal on the perforated tape is now represented by a single energized conductor from matrix core 3b. The conductor is connected to a so-called width card 7 which is preferably a patchboard having a number of input connections equal to the number of characters to be accommodated. In the present embodiment this will be 128 inputs since there are 64 conductors from each matrix core, and a width card is provided for two cores, or in other words, for each equivalent magazine consisting of an upper and a lower case alphabet or font. The patchboard width card will have as many output connectors as there are discrete character widths to be provided for. Thus each input connector, representing a character, can be connected to the output connector representing the width of that character.

The width cards are in the form of removable plugs so that they can be readily interchanged when a change in the font of type is effected.

From the width cards the output connectors lead to the decimal to binary width converter 8. In this manner, the lead representing the character coded on the tape is converted to an eight bit binary signal representing the width of that character. The width information thus available may be used for justification computation or it may be used to control the spacing of characters during photography of the line.

In mode one, line mode 1 (FIG. 6) will be energized so that AND gates 48a to 48h will be ready to transmit signals that may come from width coder 8. The signals will be transmitted to the character width counter 36 which will be described hereinafter in connection with the justification computation description.

In mode three, which is the photographing mode, line mode 1 will not be energized so that the binary width information will not be transmitted by gates 48a to 48h. Rather, line mode 3 will be energized and the width information will be transmitted to the character placement selector mechanism 9 to control the spacing of the characters during line composition. This mechanism may be an escapement mechanism or it may be the character width memory control circuitry described in aforementioned Patent No. 2,923,215.

The logic components used in the present apparatus can utilize solid state components together with a minimum use of relays. This offers several advantages in that the machine computational speed can be such so as not to hamper ultimate machine speed and since this type of circuitry can be assembled on plug-in printed circuit cards it results in a reduction in production costs and complexity of wiring. Logic cards manufactured by The Ransom Research Company of San Pedro, Calif., have been found to perform quite satisfactorily. It might be well to further indicate that these cards are operated by negative logic or a negative voltage. However, it is to be clearly understood that the present invention is not limited for use with these cards but can be practiced by other logic circuits.

Reference is now made to FIG. 3 where the basic sequence control circuitry for the tape reader is shown. The timing for this circuit is shown in FIG. 2. An astable multivibrator or clock pulse generator 22 provides the pulses which operate either the forward or reverse clutch coils of the reader in modes one and two respectively, and the strobing pulse on line 17 for conditioning gates 16a to 16f in these modes. FIG. 2 shows that clock pulse generator 22 completes a free running cycle every 8.3 milliseconds (ms.). The trailing edge of this negative pulse actuates monostable flip flop 23 which produces a pulse of 3 ms. duration. This gate immediately pulses a relay driver 24 which, as well understood in the art, energizes its associated clutch coil in the tape reader after a short pick-up time delay. This pick-up delay time is important as will be seen later in this specification. When energized the clutch engages and advances the tape. The bounce of the reader contacts is illustrated in relation to the timing of the other actuating pulses as it is desirable that the contacts be read when they are in a quiescent state. The 100-microsecond (mis.) strobing multivibrator 25 is therefore pulsed on the trail edge of the pulse of astable multivibrator 23. It pulses the NAND gates 16a to 16f which monitor the reader contacts for 100 mis. Another 100-mis. monostable gate 26 is actuated by the trail edge of the pulse from gate 25 and it operates to reset flip-flops 20a to 20f only after they have fed the information decoded from the tape to the core matrices 3. It should be indicated here that clock pulse generator 22 is operative in modes one and two only while in mode three the pulses from the photocomposing machine itself operate to provide the actuation of the forward clutch and strobing pulse of the reader contacts.

The transmittal of clock pulses, either from the clock pulse generator 22 or from the photocomposing machine, is under the control of the exclusive OR gate 83 (FIG. 9) the operation of which will now be described. When the photo lead from flip-flop 34 is energized, the pulses from monostable 91 will be transmitted to gate 31, and if the other input to gate 31 is energized, i.e., the forward lead from flip-flop 29, the forward relay driver 24 will be energized to drive the tape forward at the relatively low photocomposing speed. This, of course, takes place in mode three when the mode 3 line sets flip-flop 29 for the forward direction and flip-flop 34 for the photo condition.

When the shift is made to mode one operation, the mode 1 lead is energized to switch flip-flop 34 to the scan condition, but flip-flop 29 is not affected. This is because in both modes one and three the tape is advanced in the same direction. The switching of flip-flop 34 to the scan condition sets OR gate 83 to pass the pulses generated by the clock pulse generator 22 with the result that during mode one operation the tape is moved at high speed.

When the shift is made from mode one to mode two the energization of mode 2 line causes flip-flop 29 to be switched so that its reverse output lead is energized. This causes gate 30 to be conditioned to pass pulses from clock pulse generator 22 and the tape is driven in the reverse direction at high speed. In the switch from mode one to mode two generation, flip-flop 34 was not triggered so that the high speed drive of the tape continued.

In shifting from mode two to mode three, both flip-flops 29 and 34 are switched so that the direction of tape feed is changed to the forward direction, and the speed at which the tape is driven is controlled by the photocomposing machine rather than by clock pulse generator 22. It is appropriate at this time to set forth the operation of the end of line counter 1, and two of the more important gates, in the sequence control circuitry. See FIG. 9. When an end of line signal, or more specifically the elevate code on a TTS tape, is decoded (this signal comprises a single perforation in position number 2 on the tape), the second reader contacts C2 separate. Gate 14 (FIG. 4) will generate an output to the end of line counter by way of OR gate 27 which actually triggers the counter. Counter 1 is provided with three output lead lines consecutively indicating the mode of operation of the apparatus. These three mode lines are directed to various gates in both the computational and sequence control circuitry to condition such gates for operation and thereby control their functioning. When the end of line counter is pulsed to turn on its output line indicative of mode two, flip-flop 29 is triggered. This actuation of flip-flop 29 energizes the gate 30 and turns off the forward line input to AND gate 31. As will be seen, the outputs of flip-flop 29 control other functions in the computer 4. With AND gate 30 so conditioned, the pulses from clock pulse generator 22 and monostable 23 will be transmitted to the reverse relay driver 24a and the reverse clutch coil. In this manner each pulse from monostable 23 will drive the tape one step in the reverse direction. Moreover, since the forward output line of flip-flop 29 is turned off, the AND gates 32a to 32b are shut off (FIG. 5) and core matrices 3a to 3b are conditioned not to pass the information from the tape reader 5. In summary, during mode two, as the tape is stepped in the reverse direction the signals in the tape are suppressed and not decoded.

Now, as the tape continues to be stepped in the reverse direction, the preceding elevate code will move into decoding position and gate 14 will again be transmitted a pulse to end of line counter 1. This causes counter 1 to energize mode three line, or in other words, to set the circuitry for the photographic operation.

The mode three line triggers the forward reverse flip-flop 29 to close gate 30 and open gate 31. In this manner the tape reader will be driven in the forward direction by the clock pulses coming from the photographic machine. These pulses will be fed through AND gate 84, monostable 91, exclusive OR gate 83, and gate 31 to the forward relay driver 24. As explained before, driver 24 will energize the forward clutch coil to step the tape in a forward direction.

At the same time energization of the mode 3 line triggers the photo scan flip-flop 34 through the monostable gate 35. Triggering of flip-flop 34 energizes the photo line output therefrom to set exclusive OR gate 83 and pass the clock pulses from the photographic machine as previously mentioned. More importantly, the restoration of the scan line output from flip-flop 34 to its quiescent state shuts off gate 86 so that clock pulse generator 22 is prevented from operating in its free running state. The output of gate 35 also pulses end of line counter 1 through OR gate 27. The counter is triggered at this time to advance one count for the reason that counter 1 is a conventional two stage binary counter having four operating stages. Since the present apparatus requires only three stages for the three operating modes, after mode 3 is recognized the counter is advanced one count so that when AND gate 14 recognizes the next end of line signal, indicating the completion of a mode three operation, the counter will be switched to its mode one condition to set the apparatus for a justification computation.

Energization of the mode 3 line is also seen, FIG. 4, to set the character identity selector 12 so that as the tape signals are decoded, the characters represented thereby are photographed in line composition. To insure proper spacing of the characters, mode 3 line also sets the character placement selector 9 which, it will be recalled, is actuated in accordance with the width of the character signal represented on the tape. The width information is obtained from one of the matrix cores 3a to 3d and the width card 7 representing the typographical font of characters in use in the photographic unit of the system. During mode three operation, the justification information computed during mode one operation is utilized to provide the proper interword spacing between words. Thus, in FIG. 9, energization of the mode 3 line conditions AND gate 73 so that whenever an interword space signal is decoded in the tape reader, a pulse is transmitted over line 74 and gate 73 passes the pulse to trigger monostable 68. This pulse, in turn, triggers monostable 69 and the AND gates 70a to 70h. These latter gates will have been conditioned by the quotient answer, i.e., the justification word space information, stored in quotient counter 59. Thus, the pulse from monostable 69 causes the quotient answer to be transmitted to the character placement selector 9 which provides the desired interword spacing during line composition. Again, for reference, this selector 9 may be the space and character width memory input of Patent No. 2,923,215.

At the completion of line composition, which will be the end of a mode three operation, an end of line signal, i.e., the elevate signal will be decoded. This signal will cause gate 14 (FIG. 4) to transmit a pulse to OR gate 27. Therefore, a pulse is transmitted over line 98 to end of line counter 1, which is advanced one count, and the mode 1 line therefrom is energized. The photo scan flip-flop 34 is triggered, and its scan output line is rendered operative. Thus exclusive OR gate 83 is conditioned to transmit pulses from monostable 23 and the clock pulse generator 22. The clock pulse generator is set in its high speed free running condition by the action of the scan line output from flip flop 34 on gate 86. Thus the forward clutch coil is energized at a high speed to rapidly advance the tape during the justification computation mode of operation. It might also be noted here that since the tape advances through the reader 5 in the same direction during mode three and mode one operations, when the end of line counter is switched from the former to the latter mode, there is no need to trigger the forward-reverse flip flop 29. Only the rate at which the tape is advanced is changed as by switching clock pulse generator 22 into operation.

The signals decoded from the tape by strobing the reader contacts C0 to C5 are, as previously described, fed to storage flip flops 20a to 20f. Each of the twelve output lines from these flip flops is fed into four identical core matrices 3a to 3d (FIG. 5). Each matrix in the standard manner converts the six bit binary code to a single output line, there being, of course, 64 such lines for a six bit binary code. The four matrices may be considered to represent the equivalent of two linecasting machine magazines each having a shift and an unshift section or upper and lower case characters. Therefore, going from matrix 3a to matrix 3d in FIG. 5 the four matrices correspond to the shift and the unshift characters of a first magazine and the shift and the unshift characters of a second magazine. As previously noted, only one of the four matrix decoders will be operative at one time to feed its single line output to a width card 7 associated with each two matrices or one magazine. The four binary to decimal matrices can be readily constructed from a binary decoder matrix Type BIP–8101 manufactured by the Burroughs Corporation. It is a common practice to include an isolating diode in the output lead line of each matrix to prevent any feed back to the other matrices.

Each width card 7 takes the single actuated input line which represents the decoded character and feeds this single line to an appropriate input connector of a decimal to binary coder 8. This coder provides an eight bit binary code of the width of the character represented by the single output lead from width card 7. As previously noted the character identity in every case will always be indicated by specifically one of 64 lines of its associated matrix. The width card therefore performs the function of merely routing this line to its appropriate point in the character width coder. Therefore each time a different font of type is to be used only the width card will have to be changed. The output of coder 8 is fed to either character width counter 36 or to the character placement selector 9 of the photocomposing machine depending upon the mode in which apparatus is operating. It is to be especially noted that the interword space signal passing through the matrices is not routed to the selector 9 or the counter 36 but directly to the computer circuitry shown in FIG. 9.

The selection of the appropriate magazine matrix 3 is accomplished by means of the AND selection gates 32a to 32d of FIG. 5. Each of matrices 3a to 3d, as indicated, receives the same information from the tape reader 5. Since the control tape will contain information as to the magazine, i.e., the font from which characters are to be photographed, the signal as to magazine "1" or magazine "2" (the present description is for a two-magazine machine although it could just as well have described a four, or more, magazine in a line) will go through all matrices 3a to 3d and exit therefrom on line mag 1 or line mag 2. Thus magazine flip-flop 38 will be set and an appropriate voltage representing the selected magazine will appear as an input to two of gates 32a to 32d. In like manner, a shift or unshift code (it should be remembered that these codes are always present on a TTS tape) will be decoded to set shift-unshift flip-flop 37. It, in turn, places a voltage representing shift or unshift on gates 32a to 32d. It follows, that only one of the gates will be conditioned depending on the signals decoded, and an appropriate voltage from forward-reverse flip-flop 29, and only one matrix will thereafter be operative to pass on decoded character signals. It will be assumed that the machine is operating in a mode one or mode three since in the mode two condition the reverse input line from flip-flop 29 will be off (FIG. 10) and the decoded character signals will, in effect, be suppressed. Now if a change of magazine code is read then a different gate, 32a to 32d, will be rendered operative as will a different matrix. Similarly, the decoding of a shift signal, assuming an unshift signal was first read, will cause a different matrix to be brought into operation.

In the described arrangement for selecting the appropriate matrix a problem exists when going from the mode one computational operation to the mode two reverse tape operation to the mode three line composition operation. Assume that from the previously composed line the machine was left with matrix 3b operative, indicating that composition is from the unshift characters of magazine "1." Now during the mode one operation for the next line assume signal is decoded, flip-flop 37 will switch to indicate this change and matrix 3b will switch off while matrix 3a switches on. During the reverse feed of the tape in mode two all the matrices are disabled due to gates 32a to 32d being opened by the absence of a voltage from forward reverse flip-flop 29. Now, during mode three, operation matrix 3a will be operative, which is of course in error as matrix 3b should be operative. Therefore, upon recognition of the end of line code signaling the end of mode 2 and the beginning of mode 3, the shift or unshift signal for the first character in the line should be set in the flip-flop 37. This can be accomplished as follows: during a mode three operation the signaled outputs of flip-flop 37 are fed to AND gates 39 and 40, respectively. These AND gates are opened by a mode 3 line. As shown, there is an AND gate 41 or 42 located respectively in each output line of flip-flop 43 which feeds back to the input of flip-flop 37, also in mode three. With this arrangement the problem is solved. Take the previous example, when the reader signals a change from mode two to mode three the selected shift or unshift code from the previously composed line will be fed back to the appropriate input of flip-flop 37 so that it will indicate an unshift code. Composition can commence in proper order. The same problem exists for magazine selections and for that reason a similar storage circuit, not shown, will have to be employed to switch flip-flop 38 to the appropriate condition when the apparatus switches from mode two to mode three.

Another signal that is encountered on a TTS tape is the upper rail-lower rail signal. In a linecasting machine matrices are generally two-letter matrices having a character in the standard casting position and another character in the auxiliary position. These characters are, for example, a Roman and an Italic letter or a Roman and a Bold Face letter, and since two letters are on the same matrix they, of course, have the same width. The selection of the desired letter on the matrix is effected by the operation of a duplex rail in the assembler elevator of the linecasting machine. If the rail is actuated, the matrix will be supported in the auxiliary position and the auxiliary character will then be cast. When the rail is restored to normal position, matrices will be assembled on standard alignment. The rail signal is a single signal so that, assuming the rail in normal position, it will stay in normal position until the rail signal is decoded whereupon the rail will move to the actuated position. Within a line, it remains in the actuated position until such time as the rail signal appears again and the rail is restored to its normal position. At the completion of each line, the rail is restored to its normal position. Thus if composition is to continue on the rail from line to line, an upper rail-lower rail signal must appear at the beginning of each line.

Since the control tape with which we are concerned must be usable in either a linecasting machine or a photocomposing machine as here contemplated, the circuitry herein described must control the photocomposing machine to respond to the upper rail-lower rail signal in a manner similar to that outlined above for a linecasting machine The circuit arrangement for this purpose is shown schematically in FIG. 5. During mode one and mode three operation the upper rail-lower rail (UR-LR) flip-flop 45 will be triggered by the UR-LR code signal transmitted to the photocomposing machine to control the character selector mechanism to photograph the appropriate character, e.g., a Roman or an Italic character. Since, as previously mentioned, there must be a rail signal at the beginning of each line, if composition is to continue "on the rail" there is no problem of restoring flip-flop 45 to its proper state as with the shift-unshift flip-flop 37 and the magazine flip-flop 38. A switch 47 is provided so that flip-flop 45 may be set by the machine operator with the "rail in" as the normal operating condition or the "rail out" as the normal operating condition. Of course, in a photocomposing machine, "rail in" or "rail out" simply controls the font which is employed in line composition.

As indicated each character in a font has a definite set width measured in units of a typographical measure, e.g., ems and units of an em, or picas and points. Therefore, if one were to add up the widths of all the characters in a line, a definite number of units would be arrived at indicative of the space in the line actually occupied by the characters. At the same time, the length of the line in which the characters are to appear, called the justified line lengths, will be known and also given a value in units. The difference between the units of the justified line lengths and the units of a composed line of characters is termed the line remainder. This number of units in the remainder must be apportioned among the interword spaces if the line is to be justified to its selected length. If the number of interword spaces is an aliquot part of the remainder then the quotient of the remainder divided by the number of interword spaces represents the width in number of units that comprises each interword space. On the other hand, if the number of interword space is an aliquot part of the line remainder, then the quotient represents the minimum interword space and remainder represents the number of interword spaces that must have an additional unit added thereto to justify the line. In other words, the quotient remainder will represent the number of interword spaces which will be one unit greater than the quotient number of units in the composed line.

The justification computation will now be briefly explained and then set forth in detail. In connection therewith, attention should be directed to FIGS. 7, 8, and 9. A character width counter 36 is provided which has a fixed capacity that exceeds the maximum individual character width; its count is set each time a character has been decoded by the diode matrices to equal the width of the character decoded. The character width information is fed into counter 36 through AND gates 48a to 48h, provided the gates are, as shown, conditioned to pass information by the mode 1 output line. Counter 36 is a conventional binary counter and it is set to operate in a down count mode so that when it has been pulsed a number of times equal to its set count, which is the width of a character, the count will be in a zero count condition. The pulsing mechanism for counter 36 will be an astable multivibrator, hereinafter called pulse generator 49 (FIG. 8).

There is also provided a down counting line length counter 50. This counter is also a conventional binary counter which is preset with the selected justified line length by manually operated line length selection switches 11. These switches, 11a, 11b, and 11c, are rotary switches that represent hundreds, tens, and units, respectively, and they are manipulated to set the line length counter accordingly. The settings for a particular line length are obtained from a conversion chart which gives the equivalent numerical value for line lengths known in picas and points. A similar chart can be provided if line lengths are known in ems and units of an em for various point sizes.

After the character width is fed to the character width counter 36 the pulse generator 49 is uninhibited and proceeds to deliver a succession of pulses simultaneously to counters 36 and 50 until a circuit 51 recognizes "zero" storage in the character width counter 36 and shuts off the pulse generator. (See FIG. 8.) This process proceeds for all characters in line so that at the end of line the line remainder will be held by the line length counter 50. During the process whenever an interword space is decoded an interword space register or counter 52 will be pulsed for totalling the number of interword spaces in line.

When the line is completed and the end of line signal following the character signals is decoded, the end of line counter is pulsed to switch from mode one operation to mode two operation. The mode 2 line (FIG. 8) switches on pulse generator 49 and the justification computation commences. As previously observed, during mode two operations the forward-reverse flip-flop 29 is triggered so that the reverse output line is energized. In addition to reversing the tape drive, previously described, the AND gate 54 is set to pass the pulses generated by generator 49 through OR gate 61 to the line length counter 50. When a number of pulses equal to line remainder is transmitted to counter 50, the counter is restored to zero count, which fact is recognized by the zero recognition circuit 64. Circuit 64 triggers flip-flop 53 to turn off pulse generator 49.

The pulses just described, equal in number to the line remainder, are fed by line 55 to the quotient remainder counter 57 which is a binary counter capable of counting in either an up or a down direction and at this time is set in the up count mode by flip-flop 75. A coincidence circuit 58 is interposed between the interword space register and the quotient remainder counter and delivers a pulse when coincidence between these two counters is reached. This pulse performs two functions, first it operates to reset the quotient remainder counter 57 to zero, and secondly pulses the quotient counter 59. This counter is also a binary counter capable of counting in either an up or a down direction. During mode two, it counts up from zero. Thus, when the line remainder stored in the line length counter 50 has been reduced to zero the pulse generator 49 inhibited the quotient counter 59 will have stored therein a count equal to the justification quotient value and quotient remainder counter 57 will have a count stored therein equal to the quotient remainder.

During mode three this justification answer must be made available upon the signal for an interword space. When an interword space code is read in the tape reader the signal representative thereof is branched to perform two functions. It first interrogates the quotient remainder counter 57 to see if a count is stored therein, and if so, the add "1" line is activated to add a count of one to the quotient stored in counter 59. In other words, counter 59 now has a count stored therein equal to the quotient plus one. At the same time the interword space signal reads the count in the quotient counter 59 and delivers it to the character placement selector 9 in the photocomposing machine. Shortly thereafter circuits actuated by this same interword pulse cause the subtraction of one bit from both the quotient remainder 57 and the quotient counter 59. This process of adding one count to the number stored in quotient counter 59, reading out the new number, and then substracting one count from both the quotient and the quotient remainder counters will continue until the quotient remainder counter has been exhausted or reaches a storage counter of "zero." It will be noted here that during mode three operation, counter 57 is set by flip-flop 75 to count in a down direction. At this point the add "1" line will not be triggered and the subsequent subtraction operation will not be initiated. Subsequent interword space signals will read out the quotient from counter 59 and deliver it to the character placement selector 9 in the photocomposing machine. The apportioning of the quotient remainder to the first number of interword spaces in a line, in order to justify the line is per se old.

The justification operation including justification computation will now be reviewed. It will be noted that the mechanism is set for mode one operation with the line of character signals ready to proceed through the tape reader. The photo-scan flip-flop 34 will be set to cause astable gate 22 to operate in the high speed mode so that the tape is advanced through the reader rapidly. The line length counter 50 (FIG. 7) is preset with the justified length of line to be composed by three manual switches 11a, 11b, and 11c. These can be thumbwheel actuated rotary modular switching units which by a simple setting can provide the appropriate circuit path to various binary stages of counter 50. Thus when the mode 1 output line is energized it pulses a monostable gate 65 which, in turn, pulses the various binary stages of counter 50 to set the counter in accordance with the operator selected justified length of line.

As the character signals are decoded, the widths for each character will be fed through gates 48a to 48h to the character width counter 36. For each character circuit 51 recognizes the storage of a count in counter 36, and it triggers flip-flop 53 which, in turn, initiates operation of pulse generator 49. The pulses are gated through AND gate 60 to restore counter to its zero count condition, at which time circuit 64 recognizes the zero count and triggers flip-flop 53 to shut pulse generator 49 off. This is repeated for each character in the line.

The series of pulses equal in number to the assigned character widths are also transmitted to the line length counter 50 through OR gate 61 where the pulses are cumulated thus representing the sum total of character widths in the line. At this time line length counter 50 will have a count therein equal to the line remainder. During scanning of the line, each interword code was read and a signal representative thereof transmitted to interword space register 52, which at the end of the line has a count stored therein equal to the number of interword spaces in the line.

At the end of the line the end of line signal on the tape will be decoded and the apparatus will be switched to a mode two operation. This switching activates gate 54 while disabling gate 60. Switching of the apparatus to mode two operation energizes mode 2 line (FIG. 7) which triggers flip-flop 53 to initiate operation of pulse generator 49. The pulses thus generated will be transmitted through gate 54 to step counter down to a zero count whereupon circuit 64 will respond to the zero count by triggering flip-flop 53 to turn off pulse generator 49.

As counter 50 is being stepped down to a zero count by pulse generator 49, the pulses are also fed to the quotient remainder counter 57. The coincidence gate 58 (FIG. 8) interposed between the space register 52 and the quotient remainder counter 57 operates to recognize a coincidence in the count stored in these two counters and to generate a pulse when there is coincidence. This pulse actuates monostable gate 66 which operates to reset quotient remainder counter to zero and to transmit a pulse through OR gate 67 thereby adding a count to quotient counter 59. This computational operation continues until the count in line length counter 50 is reduced to zero, at which time circuit 64 shuts pulse generator 49 off. At such time the justification answer in terms of a quotient and a quotient remainder will be stored in counter 59 and counter 57, respectively. This feature is important in that the same counters used to compute the answer are made available to be interrogated during mode three by the signal for an interword space to transfer the answer into the character placement selector 9, located in the photocomposing machine and for that reason not detailed here as it can be of a number of configurations as will be well understood in the art.

The operation for obtaining the justification answer from counters 57 and 59 will be generally described. Both counters 57 and 59, as previously noted, are capable of counting in either an up or a down direction. Flip-flop 75 and 76 are steering gates which operate upon their respective counters to set them for an up or down count. In mode two, the mode 2 line (FIG. 8) sets flip-flop 75 to an up count state, and also enables OR gate 77 to set flip-flop 76 to an up count state. In mode three, the mode 3 line sets flip-flop 75 to a down count state and sets flip-flop 78 which sets gate 73 (used in the subtract "1" count circuit) and gate 79 (used in the add "1" count circuit) to transmit pulses fed thereto. Gate 71 is used to recognize a zero count in the quotient remainder counter 57 and when it does it resets 78 to close gates 73 and 79. The logic is such, therefore, that when gate 71 recognizes zero storage in counter 57, the interword signal pulse to monostable 68 will be transmitted only to the AND gates 70a to 70h. In mode three, when an interword space code is decoded at the tape reader, the justification answer is read out of the quotient counter after two delay periods interposed by monostable 68 and monostable 69. It will be noted that monostable 68 is triggered by the mode 3 output line and the decoded interword space signal. The pulse from monostable 68 is fed through AND gate 79, provided gate 71 recognized a count indicating a quotient remainder in counter 57. The pulse triggers flip-flop 76 which sets counter 59 to count up, and immediately, through OR gate 67, the pulse adds a count of one to the quotient. Thereupon when the pulse from gate 69 is fed to a series of AND gates 70a to 70h each one of which monitors a separate binary stage of quotient counter 59, the quotient pulse one information stored in the counter 59 is thereby fed to selector 9. The pulse from monostable 69 will also be transmitted through monostable 80 to trigger flip-flop 76 to set counter 59 to count down. Immediately, the pulse is also fed to the counter to step it down one count, or in other words, to restore it to a count equal to the quotient hereinabove described. This operation of first adding one to the quotient so that a value equal to the quotient plus one is fed to selector 9, and thereafter immediately reducing the value stored in counter 59 to the quotient continues for each interword space until gate 71 recognizes a zero count in counter 57 at which time gates 73 and 79 will be closed and no pulses from monostables 69 and 68 can be transmitted therethrough. For all subsequent word spaces, only a value equal to the quotient will be transmitted through gates 70a to 70h to selector 9. It will be recalled (see FIG. 7) that during mode three the character width in typographical units is also fed to the character placement selector 9 in the photocomposing machine. Each of the AND gates 70 has an isolating diode in its output line to selector 9 to prevent any unwanted feed back into the system. For the same reason isolating diodes are provided in the conductors (FIG. 7) which feed the character width selector 9.

Reference will now be made to FIG. 9 in connection with a description of an operation of the apparatus of the present invention.

It will be assumed that a TTS tape is placed in the tape reader, and that such tape is provided with an elevate, or end of line, signal preceding the first line of character signals. The reason for this will be considered hereinafter. The line length dials 11a, 11b, and 11c will be adjusted to the desired justified line length so that the line length counter will be set accordingly.

A start button, not shown, will be actuated and a clamping circuit 81 will be energized to set various of the apparatus circuits in a proper initial state. Photo-scan flip-flop 34 is initially set to operate in the scan mode such that it provides an input to AND gate 86. The other input to AND 86 is initially in an off condition since flip-flop 87 is so set by its clamping circuit 81. When the first clock pulse is generated by the photo-composing unit, it enables monostable gate 88 to trigger flip-flop 87 and transmit a pulse to AND gate 86 thereby turning on astable generator 22. Gate 89 located in the output of astable 22 will at this time still remain off as its other input from start flip-flop 90 is off. Flip-flop 90 is initially set by its clamping circuit 81 so that its input to AND gate 84 and AND gate 89 are initially off. When monostable gate 88 returns to its normal state it actuates flip-flop 90 thereby providing a voltage at AND gates 84 and 89. Gate 89, therefore, is not conditioned to transmit pulses until after the first pulse from clock pulse generator 22. Thereafter pulses from generator 22 are transmitted through gate 89 to trigger monostable 23 which, in turn, pulses exclusive OR gate 83. The pulse to gate 30 is not transmitted since the other lead to gate 30 from flip-flop 29 is not energized. The pulse from gate 23 is also transmitted to AND gate 92. The other input to gate 92 is provided by flip-flop 93 which is on at this point since it was so set by clamping circuit 81. Thus the first output pulse of gate 23 is transmitted by gate 92 and feeds back and resets flip-flop 93 to an inoperative position where it will remain during the remainder of operation. The first pulse through gate 92 also pulses end of line counter 1 by way of monostable flip-flop 94.

It should be indicated that initially the end of line counter is set in its mode one condition by clamping circuit 81. However, when the above mentioned first pulse is passed through gate 92 and flip-flop 94 to pulse the counter, the arrangement is such as to change the counter from mode one to mode three, bypassing the mode two state. With the counter in mode three, the mode 3 line is energized and gate 35 photo scan flip-flop 34 will be actuated to deenergize its scan line and to energize its photo line. Astable gate 22 is now inhibited since the scan line input to AND gate 86 is off. Because the mode 3 is on, the clock pulses from the photocomposing machine will pass through AND gate 84 to pulse 3 ms. monostable flip-flop 91 which in turn pulses the exclusive OR gate 83 to actuate the forward clutch coil. The clock pulses from the photocomposing machine can be periodically produced every 80 ms. by a cam member driven by a synchronous motor. This motor can be used to operate the character selection device and other needed photo-machine functions. The tape will continue to be advanced at the slow mode three speed until the end of line signal preceding the first line is decoded. The reason for this procedure is as follows. An end of line signal must precede the first line since the apparatus would not otherwise be able to detect the end of the first mode two operation. Therefore, the machine should be in mode three just before it reads this first end of line signal so that when the end of line recognition gate 14 decodes this signal and pulses end of line counter 1 it can be shifted into the mode one operation. If just before the first end of line signal was decoded the apparatus was in mode one the recognition of the end of line signal would cause the apparatus to be shifted to mode two which would, of course, be in error.

With the apparatus functioning in mode one the pulses from clock pulse generator 22 are transmitted to the forward clutch coil as previously explained to drive the tape forward at a high speed. The pulses are also transmitted through OR gate 95 to NAND gate 96. The pulses from gate 96 trigger strobe pulse generator 25 which generates the pulses that control reading gates 16a to 16f. Gate 96 is conditioned to pass the clock pulses from gate 95 by monostable 97 which normally provides an active input to gate 96. Monostable 97 thus insures that when either the forward or the reverse clutch is being energized a strobe pulse is being transmitted to the tape reader. The apparatus thus performs a mode one operation as previously described.

When AND gate 14 recognizes an end of line signal mode one operation is interrupted and a mode two operation initiated. At the same time the end of line signal pulses monostable 97 to switch off its output lead for say 4 ms. During this time a pulse will not be transmitted through gate 96. The reason for this arrangement will be apparent from FIGS. 2, 3 and 9. When step monostable 23 is gated on it operates to pulse the forward clutch coil. There is, however, a relative delay, clearly shown in FIG. 2 between when monostable 23 is gated on and when the clutch coil is energized. Under present considerations in this interval strobing monostable 25 caused the decoding of an end of line signal, and gate 14 pulses the end of line counter 1 to initiate mode two operation. If the pulse from step monostable 23 was being gated through AND gate 31 to the forward clutch coil then upon the pulsing of EOL counter 1 gate 31 would be inhibited by flip-flop 29 and gate 30 leading to the reverse clutch coil enabled. This would cause a second pulsing through OR gate 95 which if allowed to actuate strobing monostable gate 25 would cause a second reading of an end of line code.. However, the triggering of monostable 97 by the end of line signal clearly prevents this occurrence as it disables NAND gate 96.

The tape continues moving in the reverse direction until the decoding of an end of line signal controls the completion of mode two operation and the initiation of mode three operation. The direction of tape movement will be reversed to a forward direction and the tape will advance at a relative slow rate determined by the clock pulses from the photocomposing machine. At this time the characters represented on the control tape will be photographed in line composition. This operation will continue until an end of line signal is decoded whereupon a mode one operation will be initiated; the direction of tape feed will not be changed but the speed thereof will be increased under the control of clock pulse generator 22. The operations described will be continued for each line of signals on the perforated TTS control tape.

Having thus described the invention it will be apparent to those skilled in the art that many changes could be made in the circuitry disclosed without departing from the spirit and scope of the invention. For example, instead of the tape being stepped forward and backward past a stationary reading station, the tape may be held in a stationary position and the tape reading element moved to traverse the group of character signals for a line. In the latter arrangement the tape may be positioned on a flat surface with the reading element traversing the tape in a reciprocating fashion, or the tape may be arranged over a cylindrical surface, in which case the reading element would assume a rotary sweeping action. Also, the tape reader may be a photoelectric device. Therefore, it is intended that the specification and draw-

What is claimed is:

1. A tape controlled photocomposing machine operatively responsive to a control tape having character signals and interword signals grouped thereon to represent composed lines separated by end of line signals, said character signals being for character identity only, said machine comprising, character width means, a tape reader, a justification computation and storage means, means responsive to the decoding of a character identity signal for transmitting the width information for the decoded character from said width means to said justification computation and storage means, means responsive to the decoding of an end of line signal for computing and storing the justification answer for a composed line of character signals, means for decoding the line of character signals a second time, and means responsive to the second decoding of the line of character signals and to the stored justification answer for the line for photographically composing the characters represented by the character signals in a justified line.

2. A photocomposing machine according to claim 1 wherein said tape reader is a bi-directional tape reader, and including means responsive to the end of line signal following a line of character identity signals that are read for justification computation for reversing the direction of tape feed and for initiating justification computation, means responsive to the end of line signal preceding a line of character identity signals for which justification has been computed for reversing the direction of tape feed so that said line of signals can be re-read for photographically composing the characters represented thereby in line.

3. A photocomposing machine according to claim 2, including switching mechanism responsive to the decoding of an end of line signal for controlling the direction of tape feed and the machine operation, justification computing or photographic composing, that is performed.

4. A photocomposing machine according to claim 3, including means for advancing the tape at a high speed to the end of line signal following a line of character identity signals during a justification computation and to the end of line signal preceding said line of character identity signals, and means for advancing the tape at a relatively low speed to the end of line signal following a line of character signals during a photographic composing operation.

5. A photocomposing machine according to claim 4 wherein the high speed tape advancing means includes a clock pulse generator, and the slow speed tape advancing means includes a pulse generator that is controlled by the character by character composition that takes place in the photocomposing machine.

6. A photocomposing machine that is operated in response to a control tape in which the character signals and interword space signals making up composed lines are separated by end of line signals and in which said character signals relate only to character identity, said machine comprising, means to compute justification information on a unit width basis, a tape reading element, a switching element having three output means for controlling operation of the machine, character width means, means responsive to the first output means for advancing a control tape in a forward direction past said tape reading element and for decoding the tape signals to send character width information and interword space information to the justification computing means, means responsive to the second output means for advancing the control tape in a reverse direction past said tape reading element and for initiating a justification computation, and means responsive to the third output means for advancing the control tape in a forward direction past said tape reading element and for initiating a photocomposing operation responsive to the tape signals, the character width means and the computed justification information.

7. A photocomposing machine according to claim 6, wherein said switching element sequentially activates its three output means in response to the decoding of end of line signals on the control tape whereby the decoding of an end of line signal preceding a line of tape signals representing a line of tape to be photographically composed sets said element to activate its first output means, the decoding of an end of line signal following a line of tape signals sets said element to activate its second output means, the second decoding of an end of line signal preceding a line of tape signals sets said element to active its third output means, and the second decoding of an end of line signal sets said element to activate its first output means.

8. A photocomposing machine according to claim 6 including means responsive to the activation of the first and the second output means for causing the tape to be translated at a relatively high speed, and means responsive to the activation of the third output means for causing the tape to be translated at a speed determined by the composing speed of the machine.

9. A photocomposing machine according to claim 7 wherein said switching element is a two stage binary counter, and wherein the third output means switches the counter to its four count state whereby the decoding of the next end of line signal switches the counter to its one count state in which the first output means is activated.

10. In a photocomposing machine, means for operating said machine in response to a control tape in which the character signals and interword space signals making up composed lines are separated by end of line signals and in which the character signals relate only to character identity, said operating means comprising, a tape reader, control means responsive to the sequential reading of end of line signals for causing each group of tape signals representing a composed line to be operatively read twice, a justification computing device having means for setting said device for a justified line length, character width means, means responsive to the decoding of a character signal to a width signal representing the character width, means responsive to the first operative reading of the control tape for transmitting successive width signals and interword space signals to said justification computing device, means responsive to the completion of the first operative decoding of the tape for computing justification information and storing said information in said justification computing device, means responsive to the second operative reading of the tape for photographically composing a line in response to the tape signals, the signal converting means, and the justification information stored in said justification computing device.

11. Operating means according to claim 10 wherein said tape reader is a bi-directional reader having means to translate the tape in a forward direction, and means to translate the tape in a reverse direction and wherein control means includes a binary counter having four states of operation.

12. Operating means according to claim 11 including means responsive to the decoding of end of line signals on the tape for sequentially actuating the counter.

13. Operating means according to claim 12 including means responsive to the counter being in one counting state for stepping the counter only to the next counting state whereby the counter has three stable operation states.

14. Operating means according to claim 13 including means responsive to the counter being set in a first operating state for transmitting width signals and interword space signals to the justification computing device, and means for causing the tape to be advanced at high speed in a forward direction.

15. Operating means according to claim 14 including means responsive to the counter being set in a second operating state for initiating a justification computation operation and means for causing the tape to be translated at high speed in a reverse direction.

16. Operating means according to claim 15 including means responsive to the counter being set in a third operating state for initiating a photographic composing operation and means for causing the tape to be translated in a forward direction at a speed controlled by the photocomposing machine.

17. Operating means according to claim 10 wherein said justification computing device includes a line length binary counter that is settable in accordance with a desired justified line length, means for decreasing the count in said counter as character width information is transmitted thereto, an interword space counter, means including a pulse generator for transmitting a series of pulses to said line length counter to reduce the count therein to zero after the character widths for a line of signals have been transmitted thereto, said series being equal in number to the line remainder, a quotient remainder counter to which said series of pulses are fed, a quotient counter, a pulse generating circuit for transmitting a pulse to said quotient counter each time there is coincidence between the count in said quotient remainder counter and said interword space counter whereby the line remainder is divided by the number of interword spaces into a quotient and a quotient remainder which information is stored in the respective counters.

18. Operating means according to claim 17 including means responsive to the decoding of an interword space signal for transmitting the justification information stored in the justification computing device to the photocomposing machine during photographic composition of a line.

19. Operating means accounting to claim 18 including a circuit for recognizing the storage of a count in the quotient remainder circuit, means responsive to the decoding of an interword space signal and to the recognition of a count in the quotient remainder circuit for increasing the count in the quotient counter by one, thereafter transmitting the count in the quotient counter to the photocomposing machine, and thereafter reducing by one the count in the quotient remainder counter and in the quotient remainder counter until the count in the latter counter is reduced to zero.

References Cited

UNITED STATES PATENTS

| | | | |
|---|---|---|---|
| 2,786,400 | 3/1957 | Peery | 95—4.5 |
| 3,094,050 | 6/1963 | Higonnet | 95—4.5 |

JOHN M. HORAN, *Primary Examiner.*